Aug. 18, 1953　　　　A. L. STECK　　　　2,649,183
BOTTLE CONVEYING AND TRANSFER MECHANISM
Filed Dec. 8, 1948　　　　　　　　　　3 Sheets-Sheet 1

INVENTOR.
Arch L. Steck
BY William D. Jaspert
Attorney.

Aug. 18, 1953          A. L. STECK                2,649,183
          BOTTLE CONVEYING AND TRANSFER MECHANISM
Filed Dec. 8, 1948                          3 Sheets-Sheet 2

INVENTOR.
Arch L. Steck
BY William B. Jaspert
Attorney

Aug. 18, 1953 A. L. STECK 2,649,183
BOTTLE CONVEYING AND TRANSFER MECHANISM
Filed Dec. 8, 1948 3 Sheets-Sheet 3

INVENTOR.
Arch L. Steck
BY William B. Jaspert
Attorney.

Patented Aug. 18, 1953

2,649,183

UNITED STATES PATENT OFFICE 2,649,183

BOTTLE CONVEYING AND TRANSFER MECHANISM

Arch L. Steck, Oil City, Pa., assignor, by mesne assignments, of one-half to Knox Glass Bottle Company, Knox, Pa., a corporation of Pennsylvania Application December 8, 1948, Serial No. 64,129

3 Claims. (Cl. 198—22)

1

This invention relates to new and useful improvements in bottle conveying and transfer mechanism and it is among the objects thereof to provide in combination with a pair of conveyors of a transfer device which shall intercept and transfer the bottles moving on one conveyor to a second conveyor moving in the same direction or at right angles to the first-mentioned line of travel, and which shall be adapted to properly space the bottles on such second conveyor for certain operations to be performed on the bottles, such as in connection with the labeling thereof, or for spacing the bottles suitably to be engaged by a transfer mechanism for loading on to lehr conveyors and the like.

Figure 1:
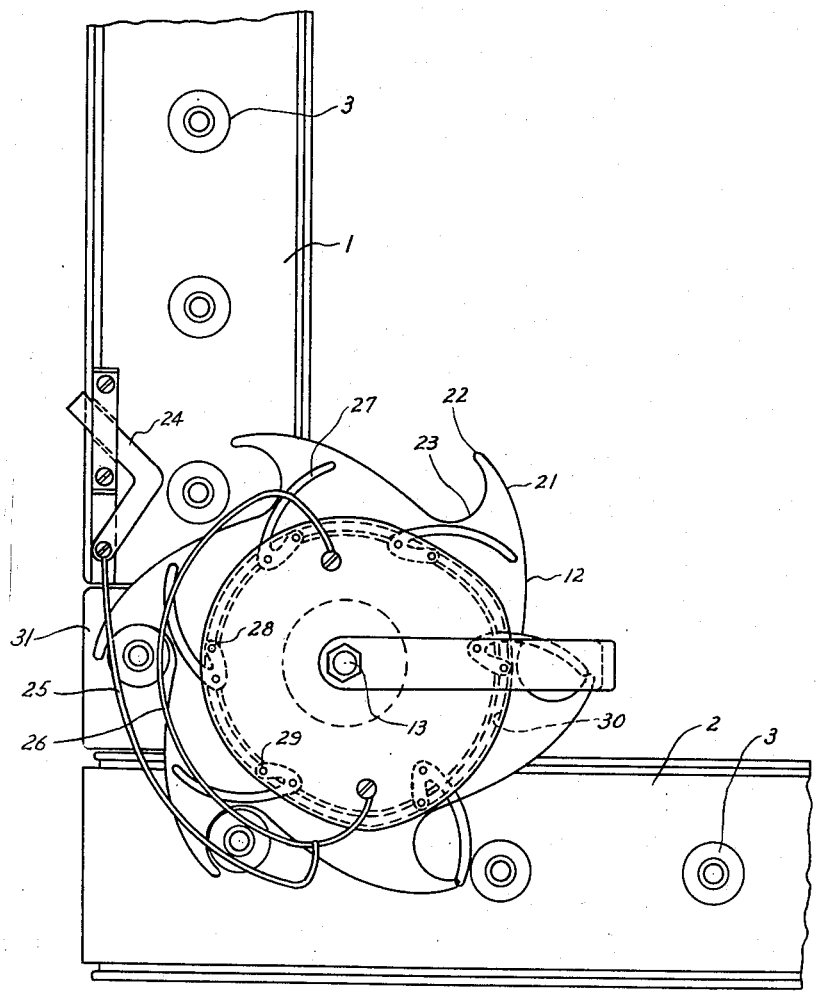
Figure 2:
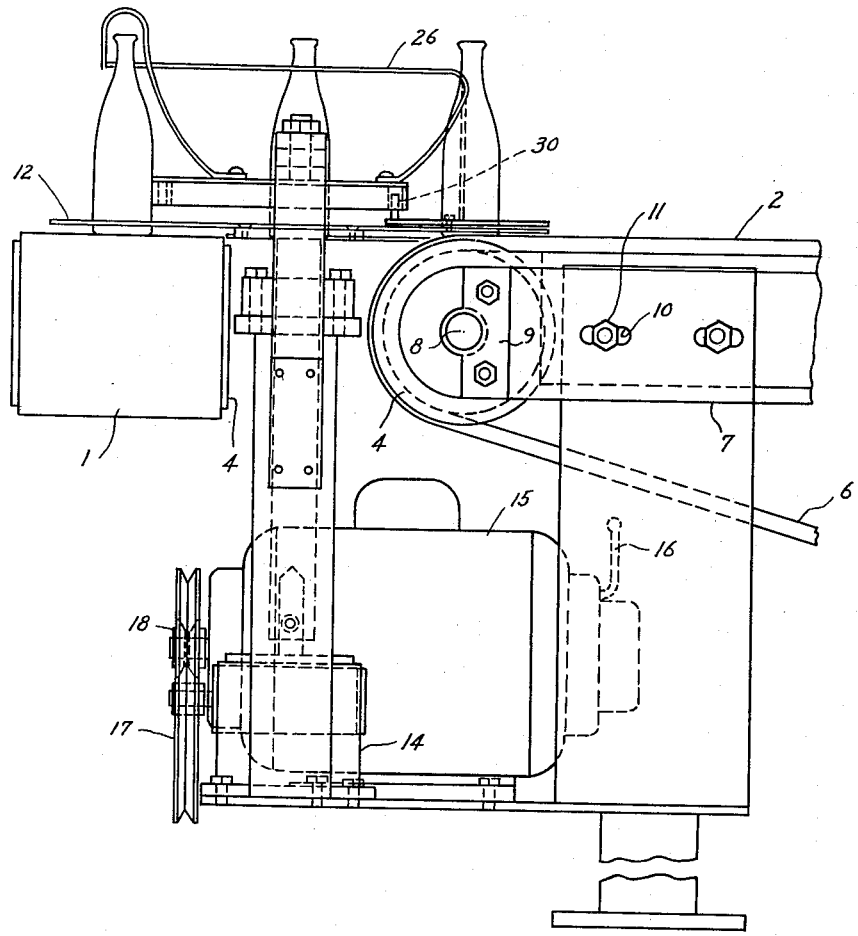

The invention will become more apparent from a consideration of the accompanying drawings, constituting a part hereof, in which like reference characters designate like parts, and in which, Fig. 1 is a top plan view of a bottle conveying and transfer mechanism embodying the principles of this invention;

Fig. 2 a front elevational view thereof; and

Figure 3:
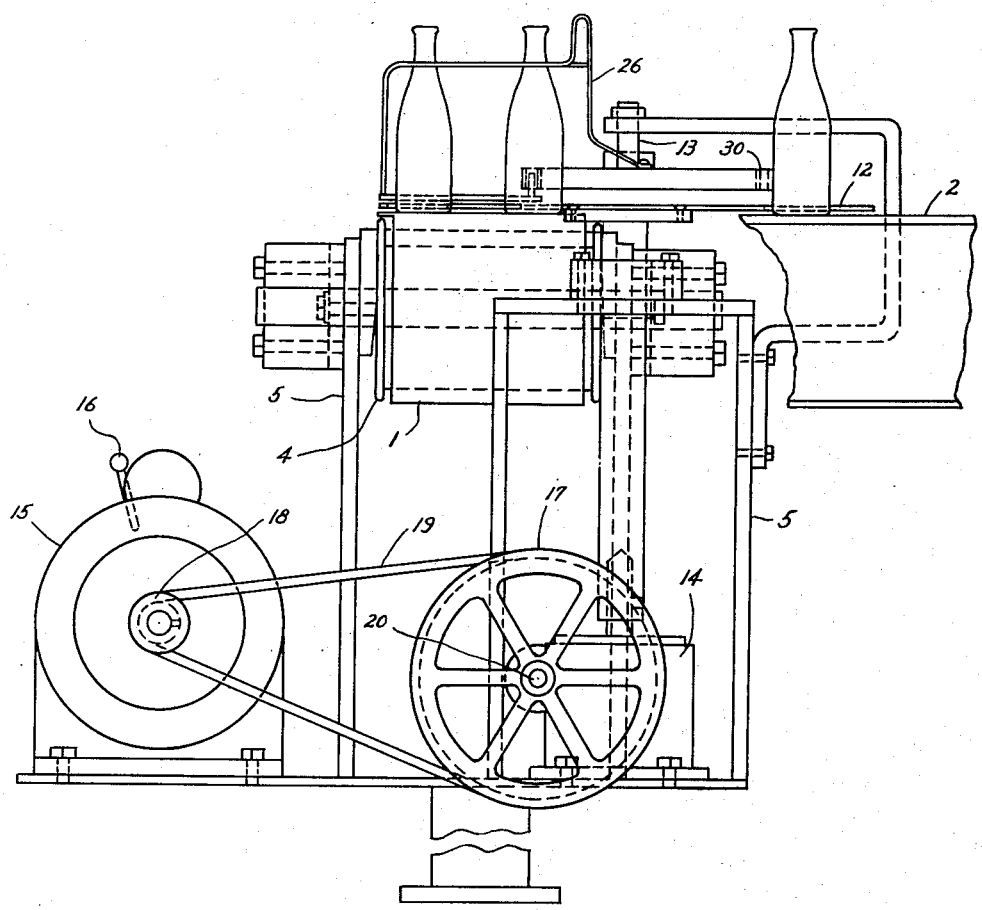

Fig. 3 a side elevational view.

With reference to the several figures of the drawings, the structure therein illustrated comprises a conveyor 1, such as a woven wire belt, leading from a firing lehr or oven, and a conveyor 2 moving at right angles to the first-named conveyor, the numeral 3 designating bottles on said conveyors. The conveyors, which are of the endless type, are mounted on drums 4 journaled in uprights 5, and the conveyor belts are suitably driven by mechanism not a part of this invention. The top strands of the conveyors are taut, as shown in Figs. 2 and 3, and the return strands may be slack as indicated by the numeral 6 of the drawings, suitable tension being provided by adjustable means, such as the mounting bracket 7, Fig. 2, on which the drum journal 8 is mounted by a clamping member 9, the bracket 7 being adjustable longitudinally within the limits of the slots 10 by loosening and fastening the clamping nuts 11.

The transfer mechanism may be generally designated a star wheel, marked by the reference character 12, which is mounted on a spindle 13 driven through a gear box 14 by a motor 15, the speed of the motor being regulable by a control arm 16. The connection of the motor to the gear box is by sheave wheel and pinions 17 and 18, respectively, and a V-belt drive 19, the sheave wheel 17 driving shaft 20 that is connected to the gear mechanism in the gear box 14 so as to subject the spindle 13 to rotary movement in a counterclockwise direction as viewed in Fig. 1 of the drawings.

The star wheel 12 has curved faces 21 in the shape of an involute curve generated by a point on a circle rolling on a larger circle. The curved faces 21 terminate in a sharp point 22 and then flare back to form a semi-cylindrical surface 23 which engages the bottles 3 in the manner shown in Fig. 1. The bottles are guided in relation to the star wheel by means of an L-shaped arm 24 and wire guides 25 and 26, the guides 25 and 26 functioning to maintain the bottles in their upright position and prevent tilting when engaged by levers 27 mounted on the star wheel 12 to which they are pivotally connected at 28.

The fingers 27 are provided with cam followers 29 operating in a stationary cam track 30 which is shaped to retract the fingers in the position of the star wheel preliminarily to its movement into the path of the conveyor 1, as shown at the upper portion of the star wheel as viewed in Fig. 1, and to bring the fingers in engagement with the bottles to expel them from the semi-circular grooves 23 in the manner illustrated at the bottom right-hand portion of the star wheel as viewed in Fig. 1.

As is apparent from Fig. 1, the bottle 3 moving towards the star wheel is deflected or guided by the L-shaped member 24 into the path of the star wheel and then carried around the conveyor over a dead plate 31 and onto the moving surface of the conveyor 2 which is traveling away from the star wheel. The bottle is then engaged by the fingers 27 and displaced from the star wheel in proper spaced relation on the conveyor 2 as shown in Fig. 1.

By varying the speed of rotation of the star wheel 12, or by adjusting cam 30, the spacing between bottles on conveyor 2 may be varied to suit different working conditions, depending upon subsequent operations to which the bottles are subjected as, for example, aligning them closely spaced in the path of a transfer arm which grips a plurality of bottles simultaneously to transfer them to another conveyor.

The combined conveyor and transfer mechanism is useful in conveying bottles or other articles from one line of operation to another either parallel or transversely of such line of operation remote from the first line of operation. For example, the bottles 3 may be moving on conveyor belt 1 from a firing lehr after they have been provided with a ceramic label, and by means of the star wheel 12 they are transferred to conveyor belt 2 which moves them to a remote portion of the plant where they may be picked up by a transfer mechanism in groups and transferred onto a lehr conveyor for subsequent annealing. Also, the bottles may be removed from belt 2 and given a second ceramic coating of a different color to complete the label, before again transferring them to a firing lehr conveyor.

Although one embodiment of the invention has been herein illustrated and described, it will be evident to those skilled in the art that various modifications may be made in the details of construction without departing from the principles herein set forth; for example, articles may be transferred from one conveyor to another where the conveyor strands are parallel instead of at right angles as shown in the drawing.

I claim:

1. In a bottle conveying and transfer mechanism, a plurality of conveyor belts moving in a plane with a dead plate or stationary support, a star wheel journaled for rotation on said plate and overlapping the conveyor belts, said star wheel having arms with curved faces in the shape of an involute curve terminating in a semi-circular recess for engaging the bottles and moving them from one conveyor to the other, arcuate guides in alignment with said star wheel in the path of travel of said bottles, curved fingers pivotally mounted on said star wheel for removing the bottles from said transfer mechanism, the curvature of the fingers being opposite to the curved faces of the star wheel, and cam mechanism for actuating said fingers to eject the bottles from said arm to transfer them in a row on the conveyor belt in predetermined spaced relation.

2. In combination, a plurality of conveyors for supporting and moving bottles converging at right angles, a transfer mechanism overlapping the terminals of said conveyors, said transfer mechanism comprising a star wheel having angularly spaced arms with involute shaped curved faces terminating in semi-circular seats for guiding and engaging the bottles of one conveyor and transferring the same by angular movement to the second conveyor, said star wheel having a plurality of curved fingers adjacent said arms mounted to rotate with said star wheel, the curvature of the fingers being opposite to the curved faces of the star wheel, a stationary cam track in superposed relation with said star wheel and followers on said fingers engaging said cam track to be actuated thereby for engaging the bottles in the transfer arms and displacing them onto the conveyor belt, and means for adjusting the cam relative to said fingers to thereby vary the spacing of the bottles on the conveyor to which they are transferred.

3. In a bottle conveying and transfer mechanism, a plurality of conveyors having their work supporting strands coplanar with a stationary supporting surface, a star wheel mounted for rotation above said stationary surface, a guide for aligning the bottles with the star wheel, said star wheel having arms which are disposed in the path of travel of both of said conveyors for engaging the ware delivered by one conveyor and transferring the same to the other of said conveyors, said arms having curved faces for guiding said bottles and a seat for engaging the bottles, a plurality of curved fingers carried by the star wheel cooperating with the ware engaging arms to eject the ware from said star wheel, the curvature of the fingers being opposite to the curved faces of the star wheel, and adjustable means for actuating said fingers to eject the ware from the star wheel to the second of said conveyors in predetermined spaced relation.

ARCH L. STECK.

References Cited in the file of this patent

UNITED STATES PATENTS

| Number | Name | Date |
| --- | --- | --- |
| 1,023,074 | Gaynor et al. | Apr. 9, 1912 |
| 1,531,081 | Dondero et al. | Mar. 24, 1925 |
| 1,535,197 | Bach | Apr. 28, 1925 |
| 2,176,121 | Burnett | Oct. 17, 1939 |